No. 723,945. PATENTED MAR. 31, 1903.
P. W. TILLINGHAST.
PNEUMATIC TIRE.
APPLICATION FILED AUG. 9, 1898.
NO MODEL.
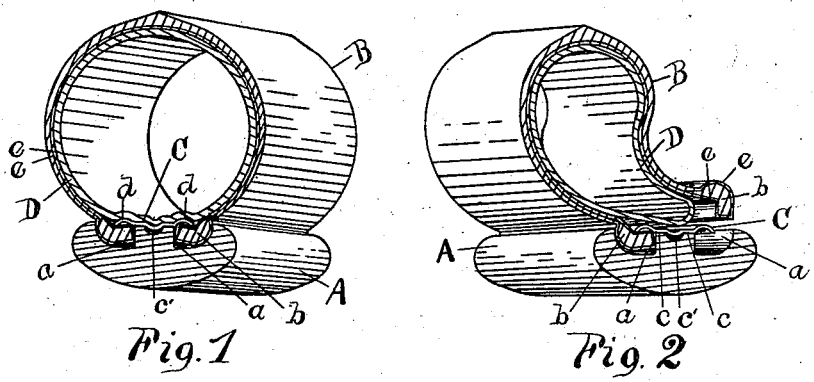
Fig. 1    Fig. 2
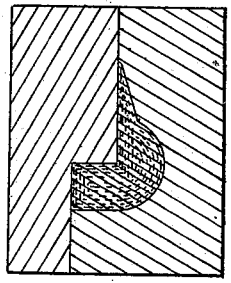
Fig. 4
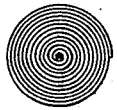    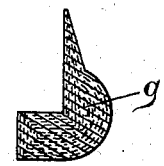
Fig. 3    Fig. 5
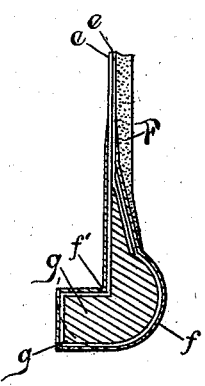
Fig. 6
Witnesses
Ira L. Fish
R. A. Bates
Inventor
Pardon W. Tillinghast,
per Wilmarth H. Thurston,
Attorney.

UNITED STATES PATENT OFFICE.

PARDON W. TILLINGHAST, OF CRANSTON, RHODE ISLAND.

PNEUMATIC TIRE.

SPECIFICATION forming part of Letters Patent No. 723,945, dated March 31, 1903.

Application filed August 9, 1898. Serial No. 688,157. (No model.)

*To all whom it may concern:*

Be it known that I, PARDON W. TILLINGHAST, of Cranston, county of Providence, and State of Rhode Island, have invented certain new and useful Improvements in Pneumatic Tires; and I do hereby declare the following specification, taken in connection with the accompanying drawings, forming a part of the same, to be a full, clear, and exact description thereof.

My invention relates to a pneumatic tire in which the air-tube is inclosed in a removable sheath or outer cover which is provided with attaching-beads adapted to enter grooves in the wheel-rim, whereby said sheath or outer cover may be detachably secured to the rim.

The object of the invention is to engage the beaded edges of the tire-sheath with the grooved rim, so that they will not be liable to become accidentally detached therefrom.

To that end the invention consists, primarily, in constructing the beads and the rim in such manner that the beads will be engaged with the grooves in the rim by a pivotal movement and in providing each bead with an extension projecting beyond the arc of a circle described from the pivotal point as a center and so forming the wall of the groove in the rim that in engaging the bead with the grooved rim the projecting extension of the bead will be sprung, bent, or compressed by the wall of the groove toward the arc of the circle referred to during a portion of the pivotal movement and will then be free to spring back or expand to its normal shape into a portion of the groove provided to receive it, thus effecting what may be termed a "spring-lock." To disengage the bead from the rim, the projecting extension of the bead will require to be sprung back or compressed in the same manner. The resistance to such springing or compression will require a correspondingly-added force to be applied to turn the bead about its pivot, the projecting extension serving as a spring-stop to prevent a too-easy turning of the bead, and thus tending to prevent any accidental disengagement.

To make certain against accidental displacement, it is desirable that in addition to providing the projecting extension referred to the bead should be substantially incompressible and so that it may not be compressed to such an extent as to enable it to be pulled out of the groove, or, in other words, so that it shall be necessary to turn the bead about its pivot in order to remove it from the groove. When the bead is thus made substantially incompressible, the spring-lock action above referred to is preferably secured by making the shape or construction of the bead or the extension such that said extension shall be capable of bending or flexing and shall also be sufficiently resilient to spring back to its normal position. If desired, however, the projecting extension may be made resiliently compressible and so that the same can be compressed toward the arc of the circle referred to during a portion of the pivotal movement and will then expand to its normal shape and into a portion of the groove provided to receive it.

A further feature of invention consists in a band of peculiar shape and its combination with the grooved rim of the wheel, said band being arranged to lie along the face of the center of the rim, with its edges overhanging the inner sides of the grooves, the extreme edges of said band forming bearing-points for the beads and the pivots about which they turn into or out of the grooves in the rim, as hereinafter more fully pointed out.

A further feature of invention consists in a novel method of constructing the beads, whereby while being sufficiently elastic to be sprung over the edge of the rim in attaching or removing the sheath they will, nevertheless, be substantially incompressible, will be of uniform density, and will retain their shape under any strain tending to pull the bead out of the groove, and so that they cannot be disengaged from the rim except by the turning or pivotal action above referred to.

In the accompanying drawings, Figure 1 represents a transverse section of the pneumatic tire and the rim of the wheel with the tire in its inflated condition. Fig. 2 represents a transverse section of the same with the tire deflated and the sheath partially removed. Fig. 3 represents a transverse section of the initial roll of rubber-covered fabric of which the pressed cores of the attaching-beads at the edges of the rim are formed. Fig. 4 represents a transverse section of the same when shaped by compression in a mold. Fig. 5 represents a transverse section of the condensed core of the bead removed from the mold. Fig. 6 represents a detail section of the sheath, showing the preferred mode of attaching the previously-condensed bead to the edges of the sheath.

In the drawings, A represents the rim of the wheel, provided with the annular grooves $a\ a$, which serve to receive the beaded edges of the removable sheath B of the pneumatic tire, the said grooves being partially covered at their inner edges by the band C, preferably of metal, which extends around the periphery of the rim A.

The pneumatic tire is composed of an air-tube D of ordinary construction and the covering-sheath B, which is preferably made of a combination of an openly-constructed tire fabric and a layer of rubber, the said tire fabric being preferably of two plies $e\ e$, located at the inner side of the sheath, the sheet of rubber F being vulcanized upon the outer side of the same. The attaching edges of the sheath B are provided with beads $b\ b$, which are preferably constructed in the manner hereinafter set forth. The outer side of each bead is in cross-section substantially in the arc of a circle, as shown at $f$, Fig. 6, and the bead is provided with an inwardly-projecting flange $g$. The circular portion $f$ is formed substantially in the arc of a circle described from the point $f'$, and the flange $g$ has a portion $g'$, which lies outside of the arc of a circle described from said point $f'$, as shown by the dotted lines in Fig. 6, which said portion $g'$ constitutes a projecting extension of the bead. As will be understood, this projecting extension may be otherwise formed and located, it being only important that it should project beyond the arc of a circle described from the point $f'$.

The band C is formed in cross-section substantially as shown in Figs. 1 and 2, the band having portions $c\ c$, which lie against the face of the rim. To prevent lateral movement, the band is preferably provided with a central projection or ridge $c'$, which enters a corresponding groove in the rim. The edges $d$ of the band C are curved or arch-shaped in cross-section and overhang the inner sides of the grooves $a\ a$ in the rim. The extreme edges of the band form bearing-points for the beads and the pivots around which they are turned into and out of the grooves in the rim, the extreme edge of the band taking into the angle or groove formed by the flange of the bead and corresponding in location to the point $f'$, from which the arc of the circle referred to is described. The arched overhanging portions $d$ of the band permit the beads to be turned somewhat more than a quarter-turn, thus insuring a positive interlocking engagement and at the same time bringing the strain of inflation on the beads in the line of greatest resistance.

In introducing the bead, which is preferably substantially incompressible, into the groove of the rim the outer end of the projecting flange is inserted into the slot formed between the edge of the band C and the outer wall of the groove $a$ until the angle or groove $f'$, formed by the projecting flange, brings up against the edge of the band, and the bead is then turned about the edge of the band as a pivot or center. The projecting extension $g'$ of the flange will strike against the bottom of the groove, which will cause said projecting extension or the entire projecting flange to be sprung or bent somewhat as the bead is turned into the groove about its pivot. The space formed by the arched overhanging edge of the band will permit this springing or bending of the flange. When the bead has been turned sufficiently far to bring the projecting extension $g'$ into the portion of the groove intended to receive it, said projecting extension or the entire flange, as the case may be, will spring back or resume its normal shape or position, thus forming a sort of spring-lock. To disengage the bead from the groove, the reverse operation must be performed—that is to say, the bead must be turned around its pivot-point—and as the projecting extension $g'$ in its normal position will not permit such turning sufficient force must be applied in turning the bead to spring or bend back the projecting extension $g'$ or the entire flange, as the case may be, before the bead can be turned out of the groove. The fact that the bead requires to be turned in order to remove it from the groove and the further fact that considerable force is required to thus turn the bead serve to entirely prevent accidental displacement.

The above description of the operation of the parts applies to that construction in which the entire bead, including the projecting flange, is substantially incompressible. If the projecting extension $g'$ be resiliently compressible, the contact of said extension with the bottom of the groove will cause said extension to be compressed, so as to permit the completion of the turning of the bead into the groove, the compressed portion expanding by its resiliency when the proper position has been reached and so as to lock the parts in position, as above stated.

Referring now to the construction of the beads on the tire-sheath, the beads are molded and compressed into the desired form separately from the rest of the sheath and are then attached to the edges of the sheath and the sheath and beads then vulcanized together and united into one structure by such vulcanization. The beads are preferably formed by taking a strip of thin woven fabric of the proper length, coated with rubber in the usual manner and known as "frictioned cloth," and forming the same into a mass, as by rolling it up into a roll, as shown at $h$, Fig. 3, said roll being of a length sufficient to extend around the periphery of the rim of the wheel. This roll is then placed in a mold E and subjected to pressure to give to the mass a shape in cross-section corresponding to the shape of the mold. The mold is preferably heated during the operation to soften the rubber and to cause the mass to be more thoroughly compressed and condensed. Preferably the ends of the roll of frictioned cloth are joined together prior to subjecting the mass to the action of the mold, in which case an annular mold is employed; but, if desired, the roll or mass of frictioned cloth may be molded in a straight mold before the ends are joined and the ends united after the molding is completed. The beads after being molded into the desired shape in cross-section are then to be united with the other parts to form the completed tire-sheath B. The plies e e of the tire fabric are lapped around the bead, and preferably a strip of closely-woven fabric i is placed around the bead on the outside of the plies of the tire fabric. The strip of rubber F is then placed upon the outer side of the tire fabric, and the whole, including the sheath proper and the attached beads, is then vulcanized in a suitable mold. By this method of constructing the beads and attaching them to the sheath proper a beaded sheath is produced in which the beads and sheath are formed integral by the process of vulcanization, but in which the beads are made substantially incompressible and of a uniform density by reason of the fact that the beads are formed separately from the sheath proper and molded in a separate mold, whereby the material forming the bead is compressed and condensed into a firm, compact, and uniform condition. Beads so constructed will also be stronger and better able to resist strains than beads formed as heretofore.

What I claim as my invention, and desire to secure by Letters Patent, is—

1. A tire-sheath thickened at its edges and provided at each edge with an inwardly-projecting flange, the exterior of the thickened portion being formed in substantially the arc of a circle described from the angle of the flange, said flange having a portion projecting beyond said arc.

2. A tire-sheath thickened at its edges to form attaching-beads and provided at each edge with an inwardly-projecting flange, the main body of each bead being substantially incompressible and having its exterior formed in substantially the arc of a circle described from the angle of the flange, said flange having a portion projecting beyond said arc adapted to be bent or compressed, but sufficiently resilient to return to its normal position when free to do so.

3. The combination, with a wheel-rim having grooves adapted to receive the attaching-beads of a tire-sheath, the outer portion of each groove being formed substantially in the arc of a circle but not undercut, and a portion of said groove lying outside of said arc, of a tire-sheath having attaching-beads, a portion of each bead being likewise formed in the arc of a circle and having an extension projecting beyond such arc.

4. The combination with a wheel-rim having grooves adapted to receive the attaching-beads of a tire-sheath, each groove being provided with an overhanging flange on the inside which serves as a pivot or bearing-point, of a tire-sheath having attaching-beads adapted to be inserted in said grooves by turning the same about said bearing-points, said grooves and beads being each provided with a portion formed in substantially the arc of a circle drawn from said bearing-point and with a portion lying outside of such arc, substantially as set forth.

5. The combination with a wheel-rim having grooves, of a tire-sheath having attaching-beads adapted to enter said grooves by a turning or pivotal movement, said grooves and beads being each provided with a portion extending beyond the arc of a circle described from the pivotal point with a radius substantially equal to the width of the entrance to the groove, substantially as set forth.

6. The combination with a wheel-rim having grooves provided with overhanging flanges on the inside which serve as pivots or bearing-points, of a tire-sheath having attaching-beads adapted to enter said grooves by turning the same about said pivotal points, said grooves and beads being each provided with a portion extending beyond the arc of a circle described from the pivotal point with a radius substantially equal to the width of the entrance to the groove, substantially as set forth.

7. The combination with a wheel-rim having grooves, of a band extending around the periphery of the rim and having upwardly-arched edges overhanging the inner sides of the rim-grooves, substantially as described.

8. The combination with a wheel-rim having grooves, of a band extending around the periphery of the rim, said band having upwardly-arched edges overhanging the inner sides of the rim-grooves and being held against lateral displacement by an interlocking with the rim, substantially as described.

9. The method of constructing beads for tire-sheaths which consists in forming a strip of fabric into a mass, inserting the mass in a mold, and applying pressure to said mold to give form and shape to the mass and to compress and condense the same, substantially as set forth.

10. The method of constructing a tire-sheath having attaching-beads, which consists in first forming and compressing the beads in a mold, and then uniting the beads to the body of the sheath, substantially as set forth.

11. The method of constructing beads for tire-sheaths which consists in first forming the beads in a mold, then uniting the beads to the body of the sheath, and then vulcanizing the sheath and the attached beads together, substantially as set forth.

12. A tire-sheath having attaching-beads entering the grooves of the rim in a circular direction, the beads having rounded exterior portions and angular inner sides, in combination with inward extensions that act as spring-stops against the bottom of the rim-grooves to prevent the accidental outward turning movement of the beads from the grooves, substantially as described.

13. A rim for a pneumatic tire having two parallel grooves adapted to receive the beaded edges of the tire-sheaths, in combination with a metal band extending around the periphery of the rim and having arched edges overhanging the inner sides of the rim-grooves, a central bead resting in a corresponding groove in the rim, and intermediate portions bearing on the face of the rim, substantially as described.

14. The combination, with a wheel-rim provided with two parallel grooves, of a tire-sheath having attaching-beads entering the grooves of the rim in a circular direction, the beads having rounded exterior portions and angular inner sides provided with inward extensions that act as spring-stops against the bottom of the rim-grooves, said rim-grooves being adapted to receive the beads of the tire-sheath, and a metal band extending around the periphery of the rim and having arched edges overhanging the inner sides of the rim-grooves, substantially as described.

PARDON W. TILLINGHAST.

Witnesses:
R. A. BATES,
IRA L. FISH.